US012743541B2

(12) United States Patent
Aroskar et al.

(10) Patent No.: US 12,743,541 B2
(45) Date of Patent: Sep. 22, 2026

(54) MOUNTLESS QUERYING OF LISTING DATA

(71) Applicant: Snowflake Inc., Bozeman, MT (US)

(72) Inventors: Susheel Aroskar, Fremont, CA (US); Damien Carru, New York, NY (US); Benoit Dageville, San Carlos, CA (US); Ojasvi Rajpal, Sunnyvale, CA (US); David Schultz, Piedmont, CA (US); Puneeta Sharma, San Carlos, CA (US); Chen Wang, Saratoga, CA (US); Bowen Zhang, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 169 days.

(21) Appl. No.: 18/677,698

(22) Filed: May 29, 2024

(65) Prior Publication Data

US 2025/0371186 A1 Dec. 4, 2025

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2113* (2013.01); *G06F 2221/2141* (2013.01)

(58) Field of Classification Search
CPC ............... G06F 21/6227; G06F 21/604; G06F 2221/2113; G06F 2221/2141
See application file for complete search history.

(56) References Cited

U.S. PATENT DOCUMENTS 6,311,214 B1 * 10/2001 Rhoads .............. H04N 1/32288 380/255
6,748,376 B1 * 6/2004 Beall ................. G06F 16/24573
11,113,420 B2 * 9/2021 Du ........................ G06F 21/629
11,520,920 B1 * 12/2022 Carru .................. G06F 21/6218
2004/0078272 A1 * 4/2004 Brown ................. G06Q 10/087 705/22
2011/0238482 A1 * 9/2011 Carney ............... G06F 16/9535 707/754
2014/0136577 A1 * 5/2014 Cherel ................ G06F 21/6227 707/813
2017/0262294 A1 * 9/2017 Yakan .................. G06K 7/1413
2018/0095843 A1 * 4/2018 Kedia ................... G06F 16/273
2018/0234450 A1 * 8/2018 Li ......................... G06F 16/951
2021/0409409 A1 * 12/2021 Palanisamy ............. H04L 63/08
(Continued)

*Primary Examiner* — Amir Mehrmanesh
*Assistant Examiner* — Aayush Aryal
(74) *Attorney, Agent, or Firm* — Schwegman Lundberg & Woessner, P.A.

(57) ABSTRACT

Embodiments of the present disclosure provide techniques for mountless querying of listing data. A processing device obtains a query that includes a universal listing identifier of a database, wherein the universal listing identifier is different from an identifier for the database. The processing device activates, at runtime, at least one role for accessing the database and shared objects based on the universal listing identifier. The processing device generates, based on the universal listing identifier and the at least one activated role, an in-memory placeholder object associated with the database. The processing device provides access to data of the database based on the in-memory placeholder object and the query.

20 Claims, 7 Drawing Sheets

(56) References Cited

U.S. PATENT DOCUMENTS

| | | | | |
|---|---|---|---|---|
| 2022/0138342 | A1* | 5/2022 | Avanes | G06F 16/2282<br>726/26 |
| 2023/0401181 | A1* | 12/2023 | Gnanaprakasam | G06F 16/27 |
| 2023/0403279 | A1* | 12/2023 | Gnanaprakasam | H04L 63/126 |
| 2024/0232191 | A9* | 7/2024 | Zhong | G06F 11/3409 |
| 2024/0378305 | A1* | 11/2024 | Acharya | G06F 21/6227 |

* cited by examiner

Exchange Data 200

Listing 202

Metadata 204

Access Controls 206

Heat Map 211

Version Metadata 215

Filters 208

Usage Data 210

Tags 213

User Record 212

Identity Data 214

Listings 154

Consumed Shares 156

Catalog 220

MOUNTLESS QUERYING OF LISTING DATA

TECHNICAL FIELD

The present disclosure relates to data sharing platforms, and particularly to mountless querying of listing data.

BACKGROUND

Databases are widely used for data storage and access in computing applications. Databases may include one or more tables that include or reference data that may be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let computing devices of entities perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
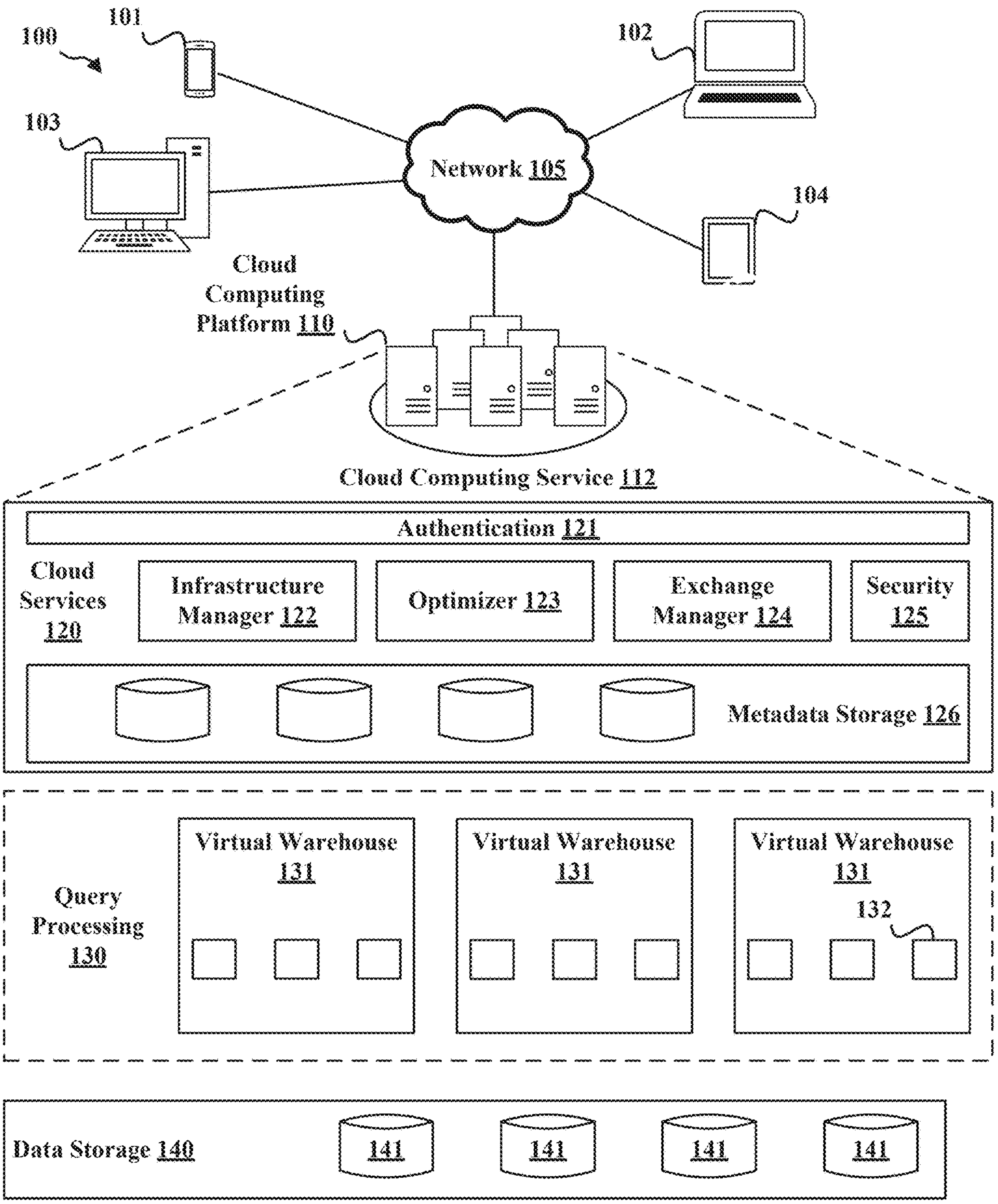
FIG. 1A is a block diagram depicting an example computing environment in which the methods disclosed herein may be implemented in accordance with some aspects of the present disclosure.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, nimbler cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is burdensome on computational resources, time-consuming, and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities (e.g., data consumers). A public data exchange (also referred to herein as a "Snowflake data marketplace," or a "data marketplace") may provide a centralized repository with open access where a data provider may publish and control live and read-only data sets to thousands of data consumers. A private data exchange (also referred to herein as a "data exchange") may be under the data provider's brand, and the data provider may control who can gain access to the private data exchange. The data exchange may be for internal use only, or may also be opened to data consumers, partners, suppliers, or others. The data provider may control what data assets are listed, as well as control which entities have access to which sets of data. This allows for a seamless way to discover and share data both within a data provider's organization and with its business partners.

The data exchange may be facilitated by a cloud computing service, such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, to inspire data collaboration, and also to maintain data governance and to audit access. With the data exchange, data providers may be able to share data without copying the data between data consumers (e.g., companies). Data providers may invite other entities to view their data listings, control which data listings appear in their private online marketplace, control who can access data listings, and control how others can interact with the data assets connected to the listings. This may be thought of as a "walled garden" marketplace in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a data Supplier or data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: entities that may enter the data exchange, entities that may view a particular listing, the computer-executable actions that an entity may take with respect to a listing (e.g., view only), and any other suitable action. In addition, a data provider may combine its own data with other data sets from other data providers (e.g., a public data exchange (also referred to as a "data marketplace")), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their data sets together to jointly create a useful data product that any one of them alone would not be able to produce. Once these joined data sets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share in a consumer account. Access to this database may be controlled at a share level by creating a hidden share role that is granted to a consumer of the share. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the data consumer accounts with which the database and its objects are shared. The data consumer accounts with which the database and its objects are shared may be indicated by a list of references to those data consumer accounts contained within the share object. Only those data consumer accounts that are specifically listed in the share object may be allowed to look up, access, and/or import from the share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges. In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process structured query language (SQL) queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., recipient of the share).

A data exchange may also implement role-based access control to govern access to objects within data consumer accounts using account level roles and grants. In one embodiment, account level roles are special objects in a data consumer account that are assigned to users. Grants between these account level roles and database objects define what privileges the account level role has on these objects. For example, a role that has a usage grant on a database can "see" this database when executing the command "show databases;" however, a role that has a select grant on a table can read from this table, but not write to the table. The role would need to have a modify grant on the table to be able to write to the table.

As noted above, a data exchange enables data providers to share data with data consumers. In some types of data exchanges, in order for a data consumer (of an organization) to consume data of a data provider (of the organization), an account administrator role may grant other roles in the same consumer account with certain privileges. In an example, the certain privileges include a create database privilege and an import share privilege. However, granting the aforementioned privileges may be undesirable from a security perspective. Furthermore, a consumer account may also create a mounted database (i.e., a local imported database corresponding to a database that includes the data that the data consumer is to consume) in memory of a consumer account associated with the consumer role, where the mounted database serves as a shallow reference to the database. Creating the mounted database may be burdensome on namespace resources of database names in consumer accounts. For example, if every role in a consumer account was permitted to mount a database, a number of available database names may be reduced, which may be undesirable. As a result, an account administrator may restrict roles that can mount a database a.

The present disclosure addresses the above and other issues by providing techniques for mountless querying of listing data. A processing device obtains a query that includes a universal listing identifier of a database, where the universal listing identifier is different from an identifier for the database. The processing device activates at run time, at least one role for accessing the database and shared objects based on the universal listing identifier. The processing device generates, based on the universal listing identifier and the at least one activated role, an in-memory placeholder object associated with the database. The processing device provides access to data of the database based on the in-memory placeholder object and the query. Vis-à-vis activating, at run time, the at least one activated role for the database based on the universal listing identifier and generating, based on the universal listing identifier and the at least one role, an in-memory placeholder object associated with the database, the processing device may be able to grant a user access to the data of the database without creating a mounted database in a consumer account associated with the user. With more particularity, the techniques described herein enable a user computing device to access data in a manner that does not involve the importation of privileges (e.g., a create database privilege and an import share privilege) to a consumer role and that does not involve the creation of a local, imported database. Thus, the techniques described herein may reduce burdens on storage resources of computing devices (e.g., a cloud computing platform), as the techniques described herein enable a user computing device to access data without creating a local, imported database. Furthermore, the techniques described herein may facilitate enhanced data security, as the techniques described herein enable a user computing device to access data without granting privileges to a consumer role. Additionally, after access to the data of the database is provided, the processing device may automatically deactivate the at least one (activated) role and remove the in-memory placeholder object from memory, thus further conserving computing resources. Furthermore, the techniques described herein may reduce namespace pollution as a user no longer needs to create a real database to consume data.

FIG. 1A is a block diagram depicting an example computing environment 100 in which the methods disclosed herein may be implemented in accordance with some aspects of the present disclosure. In particular, a cloud computing platform 110 may be implemented, such as Amazon Web Services™ (AWS), Microsoft Azure™, Google Cloud™, or the like. The cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture that includes data storage 140, query processing 130, and cloud services 120.

The data storage 140 may facilitate the storing of data on the cloud computing platform 110 in one or more cloud databases 141. The data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains offsets of each column within the file.

In addition to storing table data, the data storage 140 facilitates the storage of temporary data generated by query operations (e.g., joins), as well as data contained in large query results. This may allow the cloud computing platform 110 to compute large queries without out-of-memory or out-of-disk errors. Storing query results this way may simplify the query processing 130 as it removes the need for server-side cursors found in traditional database systems.

The query processing 130 may handle query execution within elastic clusters of virtual machines, referred to herein as virtual warehouses or data warehouses. Thus, the query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to needs of a user. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times compared to less compute nodes 132. For example, a data load which takes fifteen hours on a system with four compute nodes might take only two hours with thirty-two compute nodes.

The cloud services 120 may be a collection of services that coordinate activities across the cloud computing service 112. The cloud services 120 tie together some or all of the different components of the cloud computing service 112 in order to process user requests, from login to query dispatch. The cloud services 120 may operate on compute instances provisioned by the cloud computing service 112 from the cloud computing platform 110. The cloud services 120 may include a collection of services that manage virtual warehouses, queries, transactions, data exchanges, and metadata associated with such services, such as database schemas, access control information, encryption keys, and usage statistics. The cloud services 120 may include, but are not limited to, an authentication engine 121, an infrastructure manager 122, an optimizer 123, an exchange manager 124, a security engine 125, and metadata storage 126.

Figure 1B:
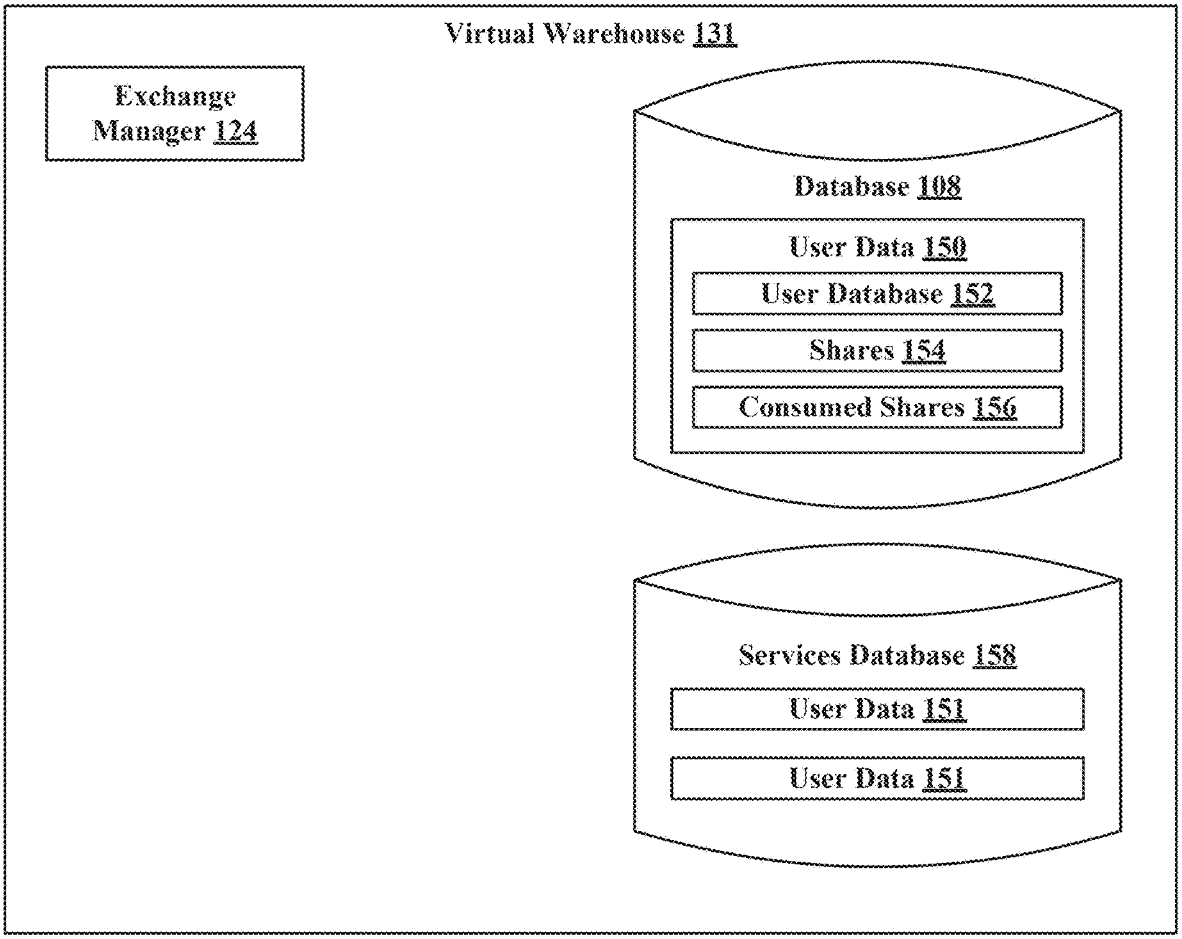
FIG. 1B is a block diagram illustrating an example of a virtual warehouse in accordance with some aspects of the present disclosure.

FIG. 1B is a block diagram illustrating an example of a virtual warehouse 131 in accordance with some aspects of the present disclosure. The exchange manager 124 may facilitate the sharing of data between data providers and data consumers, using, for example, a data exchange. For example, the cloud computing service 112 may manage the storage and access of a database 108. The database 108 may include various instances of user data 150 for different users (e.g., different enterprises or different individuals). The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that the data can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) privileges that grant access to the specific objects (e.g., tables, secure views, and secure UDFs), and (3) data consumer accounts with which the database and its objects are shared. When data is shared, no data is copied or transferred between users. Sharing is accomplished through the cloud services 120 of the cloud computing service 112.

Sharing data may be performed when a data provider creates a share of a database in an account of the data provider and when the data provider grants access to particular objects (e.g., tables, secure views, and secure user-defined functions (UDFs)). A read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., a recipient of the share).

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network. In an example, the user devices 101-104 include a mobile phone 101, a laptop computer 102, a desktop computer 103, and a tablet computer 104.

In the description below, actions are ascribed to users, particularly consumers and providers. Such actions shall be understood to be performed with respect to the user devices 101-104 operated by such users. For example, notification to a user may be understood to be a notification transmitted to user devices 101-104, an input or instruction from a user may be understood to be received by way of the user devices 101-104, and interaction with an interface by a user shall be understood to be interaction with the interface on the user devices 101-104. In addition, database operations (joining, aggregating, analysis, etc.) ascribed to a user (a data consumer or a data provider) shall be understood to include performing of such actions by the cloud computing service 112 in response to an instruction from the user.

Figure 2:
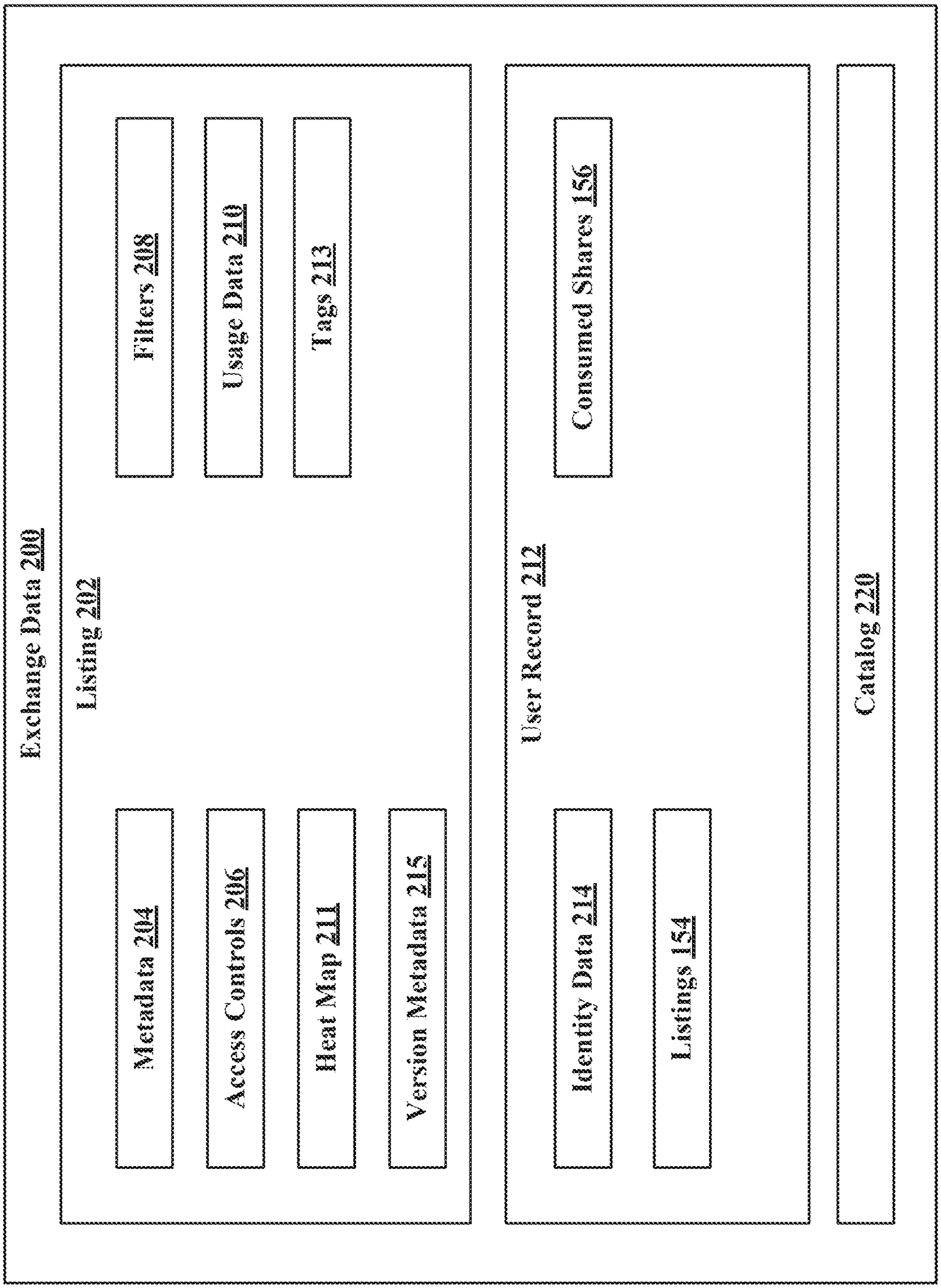
FIG. 2 is a schematic block diagram of data that may be used to implement a public or a private data exchange in accordance with some aspects of the present disclosure.

FIG. 2 is a schematic block diagram of data that may be used to implement a public or a private data exchange in accordance with some aspects of the present disclosure. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider" or "the data provider"). The listings 202 may be listings in a data exchange or in a data marketplace. The access controls, management, and governance of the listings may be similar for both a data marketplace and a data exchange.

The listing 202 may include access controls 206 which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify a "point-to-point" share in which users may request access, but are only allowed access upon approval of the provider. The access controls 206 may specify a set of user identifiers of users that are excluded from being able to access the data referenced by the listing 202.

Note that some listings (e.g., the listing 202) may be discoverable by users without further authentication or access permissions, whereas actual accesses are only permitted after a subsequent authentication step. The access controls 206 may specify that the listing 202 is only discoverable by specific users or classes of users.

Note also that a default function for listings (e.g., the listing 202) is that the data referenced by the share is not exportable by the consumer. Alternatively, the access controls 206 may specify that the default function is not permitted. For example, the access controls 206 may specify that secure operations (secure joins and secure functions) may be performed with respect to shared data such that viewing and exporting of the shared data is not permitted.

In some embodiments, once a user is authenticated with respect to the listing 202, a reference to that user (e.g., a user identifier of an account of the user with the virtual warehouse 131) is added to the access controls 206 such that the user is subsequently able to access the data referenced by the listing 202 without further authentication.

The listing 202 may define (one or more) filters 208. For example, the filters 208 may define specific identity data (also referred to herein as user identifiers) of users that may view references to the listing 202 when browsing a catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202 (i.e., by adding the listing 202 to the consumed shares 156 of the excluded user) may still be permitted to view a representation of the listing 202 when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

The filters 208 may further define what data may be viewed by a user. In particular, the filters 208 may indicate that a user that selects a listing 202 to add to the consumed shares 156 of the user is permitted to access the data referenced by the listing, but only a filtered version that only includes data associated with the identifier 214 of the user, associated with an organization of the user, or specific to some other classification of the user. In some embodiments, a private exchange is by invitation: users invited by a provider to view listings (e.g., the listing 202) of a private exchange are enabled to do by the exchange manager 124 upon communicating acceptance of an invitation received from the provider.

In some aspects, the listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and in which the credits are consumed each time a user runs a query, stores data, or uses other services implemented by the cloud computing service 112. Accordingly, the usage data 210 may record an amount of credits consumed by accessing the shared data. The usage data 210 may include other data such as a number of queries, a number of aggregations of each type of a plurality of types performed against the shared data, or other usage statistics. In some embodiments, the usage data 210 for the listing 202 or multiple listings of a user is provided to the user in the form of a shared database (i.e., a reference to a database including the usage data 210 is added by the exchange manager 124 to the consumed shares 156 of the user).

The listing 202 may also include a heat map 211 which may represent the geographical locations in which users have clicked on that particular listing. The cloud computing service 112 may use the heat map 211 to make replication decisions or other decisions with the listing 202. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make the listing available in a database whose servers are physically located in the western United States so that consumers in California may have access to data of the listing. In some embodiments, an entity may store data of the entity on servers located in the western United States. A particular listing may be very popular to consumers. The cloud computing service 112 may replicate data of the particular listing and store such data in servers located in the eastern United States so that consumers in the Midwest and on the East Coast may also have access to such data.

The listing 202 may also include one or more tags 213. The tags 213 may facilitate simpler sharing of data contained in one or more listings. As an example, a large company may have a human resources (HR) listing containing HR data for internal employees of the large company on a data exchange. The HR data may contain ten types of HR data (e.g., employee number, selected health insurance, current retirement plan, job title, etc.). The HR listing may be accessible to one-hundred people in the large company (e.g., everyone in the HR department). Management of the HR department may wish to add an eleventh type of HR data (e.g., an employee stock option plan). Instead of manually adding the eleventh type of HR data to the HR listing and granting each of the one-hundred people access to the eleventh type of HR data, management may simply apply an HR tag to a new data set and that can be used to categorize the data as HR data, list it along with the HR listing, and grant access to the one-hundred people to view the new data set.

The listing 202 may also include version metadata 215. The version metadata 215 may provide a way to track how the data sets are changed. The version metadata 215 may assist in ensuring that data (in a data set) that is being viewed by one entity is not changed prematurely. For example, if a company has an original data set and then releases an updated version of the data set, the update could interfere with another user that is processing the data set. For instance, the update could have different formatting, new columns, and other changes that may be incompatible with a processing mechanism of a recipient user. To remedy this, the cloud computing service 112 may track version updates using the version metadata 215. The cloud computing service 112 may ensure that each data consumer accesses the same version of the data until each data consumer accepts an updated version that will not interfere with current processing of the data set.

The exchange data 200 may further include user records 212. The user records 212 may include data identifying a user associated with the user record 212 (e.g., an identifier, such as a warehouse identifier) of a user having user data 151 in a services database 158 and managed by the virtual warehouse 131.

The user record 212 may list shares associated with the user (e.g., reference listings created by the user). The user record 212 may list shares consumed by the user (e.g., reference listings (e.g., the listing 202) created by another user and that have been associated to the account of the user according to the methods described herein). For example, the listing 202 may have an identifier that is used to reference the listing 202 in the shares or consumed shares 156 of a user record 212.

The listing 202 may also include metadata 204 describing the shared data. The metadata 204 may include some or all of the following information: an identifier of the provider of the shared data, a uniform resource locator (URL) associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on data of a table. Other information included in the metadata 204 may be metadata for use by business intelligence tools, text description of data contained in the table, keywords associated with the table to facilitate searching, a link (e.g., a URL) to documentation related to the shared data, and/or a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer), such as supply chain optimization. A use case may be specific to a particular industry or may apply to multiple industries. Any given data listing (i.e., any given data set) can help solve one or more use cases, and hence may be applicable to multiple use cases.

The exchange data 200 may further include a catalog 220. The catalog 220 may include a listing of all available listings and may include an index of data from the metadata 204 to facilitate browsing and searching according to the methods described herein. In some embodiments, the listings are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms. Accordingly, each listing may be globally unique (e.g., each listing may be assigned a globally unique identifier across all of the instances of the virtual warehouse 131). For example, instances of virtual warehouses may synchronize their copies of the catalog 220 such that each copy indicates the listings available from all instances of the virtual warehouse. In some instances, a provider of the listing 202 may specify that the listing 202 is to be available on only specified one or more computing platforms.

In some embodiments, the catalog 220 is made available on the Internet such that the catalog 220 is searchable by a search engine, such as the Bing™ search engine or the Google search engine. The catalog 220 may be subject to a search engine optimization (SEO) algorithm to promote visibility of the catalog 220. Potential consumers may therefore browse the catalog 220 from any web browser. The exchange manager 124 may expose URLs linked to each listing. A URL may be searchable and may be shared outside of any interface implemented by the exchange manager 124. For example, the provider of the listing 202 may publish URLs for its listings in order to promote usage of the listing 202 and its brand.

Figure 3:
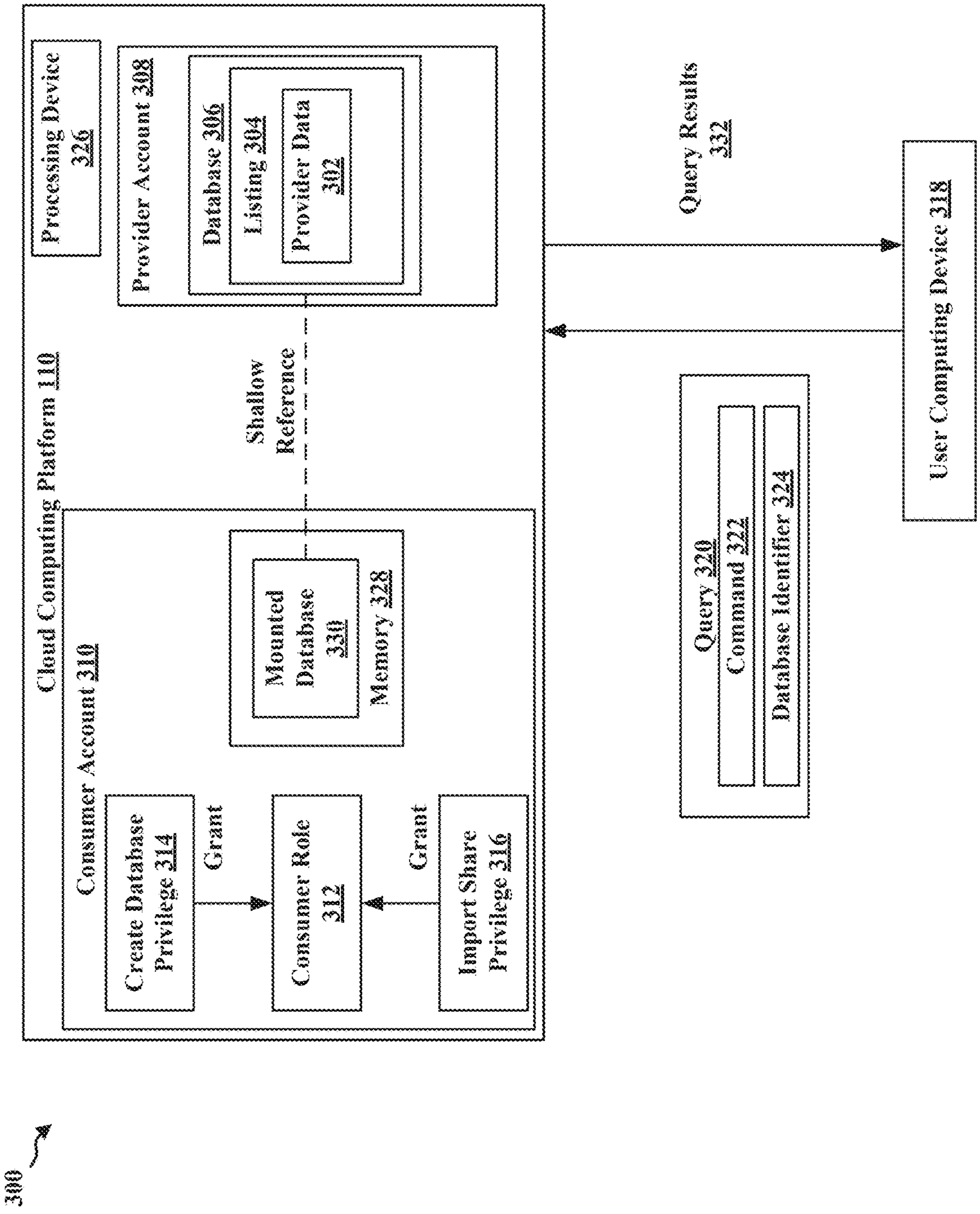
FIG. 3 is a block diagram illustrating an example of mounted querying of listing data in accordance with some aspects of the present disclosure.

FIG. 3 is a block diagram 300 illustrating an example of mounted querying of listing data in accordance with some aspects of the present disclosure. It is contemplated that a user wishes to access provider data 302 in a listing 304 of a database 306 in a provider account 308. In an example, the provider data 302 includes analytics data for a particular type of item (e.g., shoe purchase data). In an example, the user belongs to an organization. In the example, the database 306, the listing 304, and the provider data 302 also belong to the organization.

The user has a consumer account 310 with a data exchange that is executed by the cloud computing platform 110. The cloud computing platform 110 includes a processing device 326 and memory 328. The consumer account 310 has an associated consumer role 312. In order for the consumer role 312 to consume (e.g., view) the listing 304, the cloud computing platform 110 that executes the exchange grants a create database privilege 314 and an import share privilege 316 to the consumer role 312. The create database privilege 314 grants the consumer role 312 the ability to create a database. The import share privilege 316 grants the consumer role 312 the ability to view shares (i.e., data shares) shared with the consumer account 310. In some aspects, the import share privilege also grants the consumer role 312 the ability to create databases from shares. Granting the create database privilege 314 and the import share privilege 316 to the consumer role 312 may be undesirable from a security perspective.

The user computing device 318 and the cloud computing platform 110 may establish a session. Establishing the session may include the user computing device 318 transmitting security credentials of the user to the cloud computing platform 110. The cloud computing platform 110 may identify the consumer account 310 as being associated with the user based on the security credentials of the user. The user computing device 318 of the user receives a query 320 as input. The query 320 includes a command 322 and a database identifier 324. In an example, the command 322 is a SQL command. In an example, the database identifier 324 is a name of a database. For example, the command 322 may be "SELECT*FROM" and the database identifier 316 may be "MYDATABASE." In another example, the command 322 may be "SELECT COLUMN1" and the database identifier 324 may be "MYDATABASE.SCHEMA.TABLE." The user computing device 318 transmits the query 320 to the cloud computing platform 110 by way of a network.

The cloud computing platform 110 receives the query 320 by way of the network. The cloud computing platform 110 identifies the database 306 based on the database identifier 324 included in the query 320. Based on the query 320 and the create database privilege 314 and the import share privilege 316 granted to the consumer role 312, the cloud computing platform 110 creates a mounted database 330 in the memory 328. The mounted database 330 serves as a shallow reference to the database 306 (and hence the listing 304 and the provider data 302 as well) in the provider account 308. With more particularity, the mounted database 330 may be a local imported database corresponding to the database 306. The mounted database 330 may consume storage space associated with the consumer account 310.

The cloud computing platform 110 processes the query 320 based on the mounted database 330. For instance, the cloud computing platform 110 may execute the command 322 in the query 320 against the mounted database 330. The cloud computing platform 110 generates query results 332 based on executing the command 322. The cloud computing platform 110 transmits the query results 332 to the user computing device 318. The user computing device 318 may present the query results 332 on a display. Although FIG. 3 depicts only the mounted database 330 as being included in the memory 328 for purposes of explanation, it is to be understood that the consumer account 310, the create database privilege 314, the consumer role 312, the import share privilege 316, the provider account 308, the database 306, the listing 304, and the provider data 302 may be included in the memory 328 of the cloud computing platform 110 or in other memory (not depicted in FIG. 3) of the cloud computing platform 110.

Figure 4:
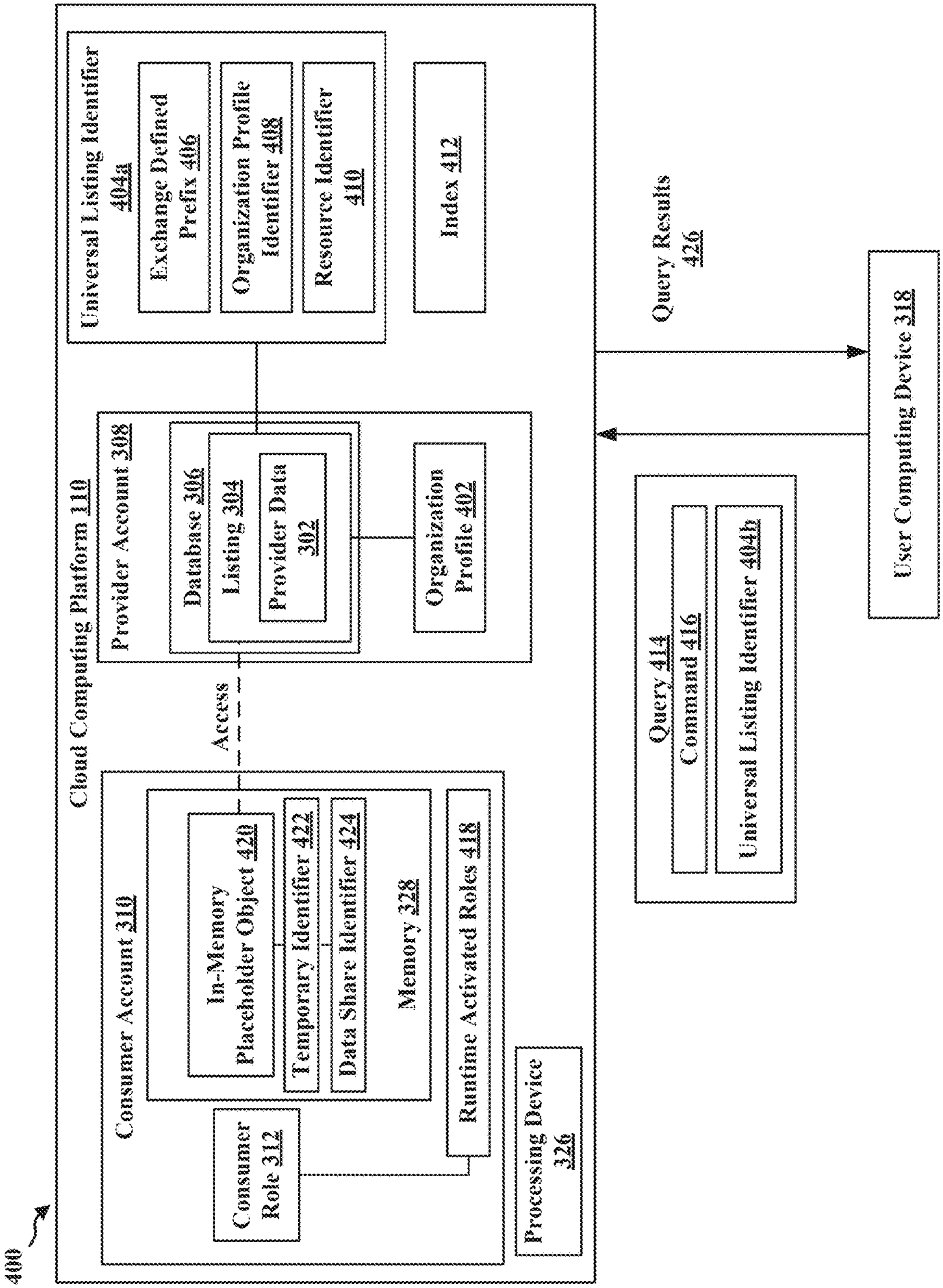
FIG. 4 is a block diagram illustrating an example of mountless querying of listing data in accordance with some aspects of the present disclosure.

FIG. 4 is a block diagram 400 illustrating an example of mountless querying of listing data in accordance with some aspects of the present disclosure. As noted above in the description of FIG. 3, granting the create database privilege 314 and the import share privilege 316 to the consumer role 312 of the user of the user computing device 318 may be undesirable from a security perspective. Furthermore, creating the mounted database 330 in the consumer account 310 may be burdensome on storage resources of the cloud computing platform and burdensome on database namespace allocation of a consumer account. To address these issues, when a provider associated with the provider account 308 creates the listing 304, the provider may bind the listing 304 to an organization via an organization profile 402 of the organization. The organization profile 402 may be an object that indicates that the listing 304 is available for mountless querying, that is, the organization profile 402 may indicate that the listing 304 may be shared with the consumer account 310 without creating the mounted database 330 (described in greater detail below). In one aspect, the organization profile 402 may be immutable once created, that is, the organization profile 402 may not be able to be renamed once created. The organization profile 402 may be associated with one organization at a time. In one aspect, the organization profile 402 may be a base dictionary entity having a global object that is replicated to all deployments having accounts belonging to the organization. Although a single organization profile for an organization is depicted in FIG. 4, an organization may have multiple organization profiles. In one aspect, the organization profile 402 may be in either an active status or a retired status. When the organization profile 402 is in an active status, new listings under the organization profile 402 can be created by the cloud computing platform 110. When the organization profile 402 is in a retired status, new listings cannot be created under the organization profile 402; however; existing listings may continue to work under the organization profile 402.

The cloud computing platform 110 may generate a universal listing identifier 404*a* based on the listing 304 being bound to the organization profile 402. The universal listing identifier 404*a* may serve as a global identifier for the listing 304 across different listings (not depicted in FIG. 4). As will be described in greater detail below, the universal listing identifier 404*a* may enable the user computing device 318 to directly query the listing 304 without having to create the mounted database 330. For instance, the generation of the universal listing identifier 404*a* may indicate that the listing 304 is deemed to be shared within an organization. In one aspect, the different listings are within an organization, and as such, the universal listing identifier 404*a* serves as a global identifier for the listing 304 within listings of the organization. In another aspect, the different listings are across different organizations, and as such, the universal listing identifier 404*a* serves as a global identifier for the listing 304 within listings across the different organizations. The universal listing identifier 404*a* may be different from the database identifier 324. The cloud computing platform 110 may associate the universal listing identifier 404*a* with the listing 304*a* based on the organization profile 402. The universal listing identifier 404*a* may also be referred to as a "canonical listing identifier," "a canonical name," "a universal locator," or "a uniform listing identifier In one aspect, the universal listing identifier 404*a* may include an exchange defined prefix 406, an organization profile identifier 408, and a resource identifier 410. The exchange defined prefix 406 may indicate a global resource or an intra-organization resource. In an example, if a resource is a global resource, the exchange defined prefix 406 may be "DATACLOUD." In another example, if the resource is an intra-organization resource, the exchange defined prefix 406 may be "ORGDATACLOUD." The organization profile identifier 408 may be a name of an external organization profile or a name of an internal organization profile. External organization profiles may be unique globally across different organizations served by an exchange being executed by the cloud computing platform 110. As such, if the exchange defined prefix 406 indicates a global resource, the universal listing identifier 404*a* may be unique across all organizations. Internal organization profiles may be unique within an organization (and not across all organizations). As such, if the exchange defined prefix 406 indicates an intra-organization resource, there may be universal listing identifiers with the same value as the universal listing identifier 404*a* across different organizations; however, within a scope of one organization, the universal listing identifier 404*a* is unique. In some aspects, the organization profile identifier 408 may act as an organization level namespace. The resource identifier 410 may be an identifier for the listing 304. In an example, the universal listing identifier 404*a* may be a string in which the exchange defined prefix 406, the organization profile identifier 408, and the resource identifier 410 are separated by a delimiter (e.g., "$"). For instance, the universal listing identifier 404*a* may be "ExchangedDefinedPrefix$OrganizationProfileIdentifier$ResourceIdentifier." In a more specific example, the universal listing identifier 404*a* may be readily understandable by a human reader in order to facilitate easier querying by users. For instance, the universal listing identifier 404*a* may be "datacloud$shoe_company$product_skus." In one aspect (not depicted in FIG. 4), the universal listing identifier 404*a* may further include an indication of an account namespace of an account of the organization. The account namespace may be a dictionary that acts as an account level namespace for listings that is created as a child of an organization provider profile.

In some aspects, the universal listing identifier 404*a* may be used with an account name space. For example, in such an aspect, an internal listing may include the exchanged defined prefix 406, the organization profile identifier 408, an account namespace, and the resource identifier 410. The combination of the exchanged defined prefix 406, the organization profile identifier 408, the account namespace, and the resource identifier may also be considered to be a universal listing identifier (i.e., a four part universal listing identifier). The account namespace may be an active account namespace assigned to an account of a provider and may be selected by the provider when the listing is listed. As an account namespace may be globally unique and exclusively assigned to one account (i.e., not shared between accounts), the combination of the organization profile identifier 408, the account namespace, and the resource identifier may be globally unique. This may enable a provider to create internal listings without having to utilize cross deployment synchronization (e.g., with an organization account) to guarantee global uniqueness. If a namespace is retired, the universal listing identifier 404*a* may continue to operate (i.e., can be resolved).

A listing may be queried using the four part universal listing identifier without mounting a database. Furthermore, an internal listing may be moved to a different namespace, which may create a new four part universal listing identifier. In some aspects, a listing may be retrieved using the four part universal listing identifier without having to parse each part of the four part universal listing identifier. This may increase the speed of retrieval of the listing as tokenization is not performed. Although the description above has focused on a four part universal listing identifier and a three part universal listing identifier, in some aspects, a universal listing identifier may include any number of parts (e.g., one part, five parts, etc.).

The cloud computing platform 110 may generate and maintain an index 412 to facilitate fast look-ups of the listing 304 which, as noted above, is referenced by the universal listing identifier 404*a*. In one aspect, the cloud computing platform 110 creates an index slice in a global object data persistent object (e.g., "GlobalObjectDPO") to index the listing 304 based on the universal listing identifier 404*a*. The index 412 may enable the cloud computing platform 110 to locate the listing 304 based on the universal listing identifier 404*a* without having to tokenize the universal listing identifier 404*a*, which, as noted above, may be a string. In one aspect, the index 412 may include slice keys and slice values as detailed in Table 1 and Table 2 below, respectively.

TABLE 1

| Slice Keys | |
|---|---|
| Name | Description |
| Domain Identifier (ID) | ID of a domain to which a resource corresponds |
| Universal Locator | Locator String (i.e., a universal listing identifier) |

TABLE 2

| Slice Values | |
|---|---|
| Name | Description |
| Replication Group ID | Unique ID of an organization |
| Deployment ID | Deployment ID of the resource |
| Account ID | Account ID of a resource owner |
| Entity ID | Resource ID |

As noted above, in some aspects, the universal listing identifier 404*a* may be unique within an organization served by an exchange executed by the cloud computing platform 110, but not unique among all organizations served by the exchange. In such aspects, in order to correctly identify a resource belonging to an organization, the cloud computing platform 110 may add an organization ID (e.g., the replication group ID) to a locator slice to create a key combination of: domain ID, replication group ID, universal locator. Alternatively, the cloud computing platform 110 may store the replication group ID in the locator string itself.

The user computing device 318 and the cloud computing platform 110 may establish a session. Establishing the session may include the user computing device 318 transmitting security credentials of the user to the cloud computing platform 110. The cloud computing platform 110 may identify the consumer account 310 as being associated with the user based on the security credentials of the user. The user computing device 318 of the user receives a query 414 as input. The query 414 includes a command 416 and a universal listing identifier 404*b*. In an example, command 416 is a SQL command. The universal listing identifier 404*b* is an instance of the universal listing identifier 404*a*. For instance, the universal listing identifier 404*b* may include the exchange defined prefix 406, the organization profile identifier 408, and the resource identifier 410. As will be described in greater detail below, the universal listing identifier 404*b* enables the user computing device 318 to consume the listing 304 without creating the mounted database 330 and without granting privileges (e.g., the create database privilege 314 and the import share privilege 316) to the consumer role 312. In an example, the command 416 may be "select*from" and the universal listing identifier 404*b* may be "listing_canonical_name.schema.table" In another example, the command 416 may be "select column1 from" and the universal listing identifier 404*b* may be "listing_canonical_name.schema.table." The user computing device 318 transmits the query 414 to the cloud computing platform 110 by way of a network.

The cloud computing platform 110 receives the query 414 by way of the network. The cloud computing platform 110 identifies the database 306 (and the listing 304) based on the universal listing identifier 404*b* included in the query 414. In an example, the cloud computing platform 110 identifies the database 306 (and the listing 304) additionally based on the index 412. For instance, the universal listing identifier 404*b* may serve as or be included in a slice key of the index 412 and the listing 304 may be indicated by a slice value of the index 412.

The cloud computing platform 110 may resolve the universal listing identifier 404*b* and perform authorization operations to determine whether the listing 304 (referenced by the universal listing identifier 404*b*) is suitable for mountless consumption. In one example, if the listing 304 is an intra-organization listing, the cloud computing platform 110 determines whether the consumer role 312 (and/or the consumer account 310) and the listing 304 are associated with the same organization. In another example, if the listing 304 is a private listing, the cloud computing platform determines whether the consumer account 310 is a target account. In either case, upon positive determination, the cloud computing platform 110 proceeds with further processing of the query 414, and upon negative determination, the cloud computing platform 110 may return an error. In some aspects, the cloud computing platform 110 may return errors if the listing 304 is a native application, if the listing does not allow mountless querying, or if the listing is monetized.

Upon determining that the listing 304 is suitable for mountless consumption, the cloud computing platform 110 resolves a local share bounded to the listing, activates a share role in a security context, activates all roles dominated by the share role i.e., activate roles granted directly or indirectly to the share role), and activates any shared database roles. For example, the cloud computing platform 110, at runtime, activates at least one role (i.e., runtime activated roles 418). For example, the cloud computing platform 110 may activate the runtime activated roles 418 responsive to identifying the database 306 based on the universal listing identifier 404*b* included in the query 414. The runtime activated roles 418 may include a share role that enables the consumer role 312 to consume the listing 304. The runtime activated roles 418 may also include a hierarchy of roles (e.g., shared database roles) associated with the share role. If the share role does not exist, the cloud computing platform 110 may return an error.

Upon activating the runtime activated roles 418, the cloud computing platform 110, at runtime, creates an in-memory placeholder object 420 in the memory 328. The in-memory placeholder object 420 may serve as a resolved qualified object that enables the listing 304 to be consumed by the consumer role 312. The in-memory placeholder object 420 may also be referred to as an in-memory placeholder database object or as an in-memory placeholder database; however, the in-memory placeholder object 420 is not a database. The in-memory placeholder object 420 may consume less storage space in the consumer account 310 than storage space consumed by the mounted database 330. Additionally, as the in-memory database is not persisted, the in-memory placeholder object 420 may not consume any database namespace in a consumer account. The in-memory placeholder object 420 may be set to be transient to prevent database IDs from running out of space. In one aspect, the cloud computing platform 110 may assign a temporary identifier 422 (i.e., "transientID") and a data share identifier 424 (i.e., "shareID") of the database 306 to the in-memory placeholder object 420. The cloud computing platform 110 may automatically unassign the temporary identifier 422 from the in-memory placeholder object 420 after the query 414 is resolved in order to preserve identifier space of the database 306. The data share identifier 424 may enable context functions/policies to behave correctly and may ensure that appropriate roles are loaded in a lazy manner (i.e., evaluation of appropriate roles is delayed until a value for the appropriate role is needed).

The cloud computing platform 110 processes the query 320 based on the in-memory placeholder object 420 in order to provide access to the provider data 302 of the listing 304. For instance, the cloud computing platform 110 may execute the command 416 (which references the universal listing identifier 404*b*) in the query 414 based on the in-memory placeholder object 420. The cloud computing platform 110 generates query results 426 based on executing the command 416. The cloud computing platform 110 transmits the query results 426 to the user computing device 318. The user computing device 318 may present the query results 426 on a display. The cloud computing platform 110 may deactivate the runtime activated roles 418 and/or remove the in-memory placeholder object 420 from the memory 328 automatically after transmitting the query results 426. Although FIG. 4 depicts only the in-memory placeholder object 420 as being included in the memory 328 for purposes of explanation, it is to be understood that the consumer account 310, the consumer role 312, the runtime activated roles 418, the provider account 308, the database 306, the listing 304, the provider data 302, the organization profile 402, the universal listing identifier 404*a*, and the index 412 may be included in the memory 328 of the cloud computing platform 110 or in other memory (not depicted in FIG. 4) of the cloud computing platform 110.

In some aspects, the command 416 of the query 414 may entail usage privileges on the database 306 (as opposed to just the in-memory placeholder object 420). Examples of such commands and queries may include "Show schemas in database listing_canonical_name" and "Show tables/views in database listing_canonical_name." The cloud computing platform 110 may utilize different approaches to authorize a usage privilege on the database 306. In one approach, the cloud computing platform 110 may create special logic to access the database 306. In another approach, the cloud computing platform 110 may create a special mapping during authorization that authorizes the usage privilege.

The universal listing identifier 404*b* may be used for various purposes other than those detailed above. In one example, a user of the user computing device 318 wishes to generate a report that predicts an impact on employees of an organization coming into an office based on local weather. In the example, the listing 304 includes anonymized employee office presence data of an organization to which the user belongs. The user computing device 318 queries the listing 304 using the universal listing identifier 404*b* and joins the listing 304 with a publicly available weather dataset stored on an exchange of the cloud computing platform 110.

In another example, the user of the user computing device 318 wishes to use a non-publicly available dataset for the report. The user may exchange credits in order to obtain the non-publicly available dataset. The user computing device 318 may cause the creation of a mounted database using the universal listing identifier 404*b*. For example, a command that causes creation of the mounted database may be "CREATE DATABASE <DB> from LISTING <CANONICAL_NAME>."

In a further example, a provider of the listing 304 may expressly indicate whether the listing 304 is available for mountless querying (e.g., via the organization profile 402). In another example, the consumer account 310 may include a parameter that indicates whether the consumer account 310 is eligible for mountless querying as described above. In yet another example, mountless querying may be enabled by default for the listing 304 if the listing 304 is a private listing (e.g., accessible only by members of a particular organization), whereas mountless querying may be disabled by default for the listing 304 if the listing 304 is a public listing.

Although the description of FIG. 4 above focuses on the generation of an in-memory placeholder object 420 based on the universal listing identifier 404*b*, other possibilities are contemplated. In one aspect, the cloud computing platform 110 resolves the universal listing identifier 404*b* as a shared provider database. In such an aspect, the cloud computing platform 110 may activate the runtime activated roles 418 as described above. The cloud computing platform 110 may provide access to the database 306 using the universal listing identifier 404*b* without creation of the in-memory placeholder object 420. In another aspect, the cloud computing platform 110 generates a persisted local anonymous imported database based on the universal listing identifier 404*b* instead of generating the in-memory placeholder object 420. The cloud computing platform 110 may provide access to the database 306 via the persisted local anonymous imported database.

Figure 5:
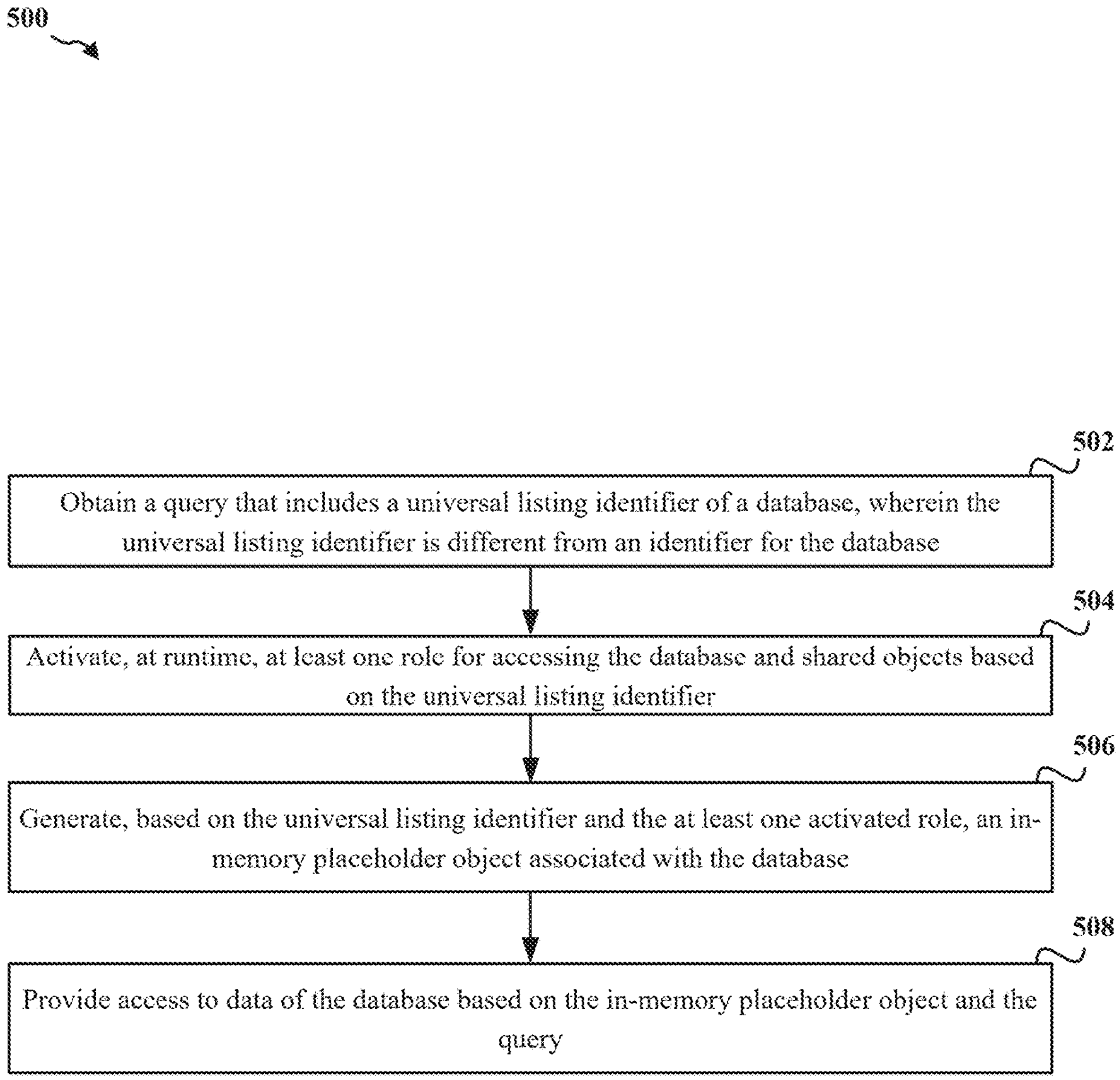
FIG. 5 is a flow diagram of a method for mountless querying of listing data in accordance with some embodiments of the present disclosure.

FIG. 5 is a flow diagram of a method 500 for mountless querying of listing data in accordance with some embodiments of the present disclosure. The method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by the processing device 326 in FIG. 4.

At block 502, a processing device obtains a query that includes a universal listing identifier of a database, where the universal listing identifier is different from an identifier for the database. In an example, the query may be the query 414, the universal listing identifier may be the universal listing identifier 404*b*, and the database may be the database 306. In an example, the identifier for the database may be the database identifier 324.

At block 504, the processing device activates, at runtime, at least one role for accessing the database and shared objects based on the universal listing identifier. For example, the at least one role may be or include the runtime activated roles 418.

At block 506, the processing device generates, based on the universal listing identifier and the at least one activated role, an in-memory placeholder object associated with the database. For example, the in-memory placeholder object may be or include the in-memory placeholder object 420.

At block 508, the processing device provides access to data of the database based on the in-memory placeholder object and the query. In an example, the data of the database may be or include the listing 304 and/or the provider data 302.

In one aspect, the universal listing identifier may include a first portion including an exchanged defined prefix, a second portion including an identifier of an organization, and a third portion including an identifier of a resource. For example, the first portion may be or include the exchange defined prefix 406, the second portion may be or include the organization profile identifier 408, and the third portion may be or include the resource identifier 410.

In one aspect, the processing device may deactivate, subsequent to providing the access to the data of the database, the at least one activated role. The processing device may also remove the in-memory placeholder object from memory.

In one aspect, providing access to the data of the database may include transmitting query results associated with the database to a computing device. For example, the query results may be or include the query results 426 and the computing device may be or include the user computing device 318.

In one aspect, the query may be associated with a computing device that belongs to an organization, and the data of the database may belong to the organization. For example, the user computing device 318 and the provider data 302 may belong to the same organization.

In one aspect, the processing device may generate, prior to obtaining the query, the database based on the identifier for the database. The processing device may obtain an indication that the database is to be shared within an organization. The processing device may generate, based on the indication that the database is to be shared within the organization, an association between the universal listing identifier and the database, where activating the at least one role for the database and generating the in-memory placeholder object may be based on the association. In an example, the association may be or include the organization profile 402.

In one aspect, the processing device may determine that a user associated with the query and the database are associated with a same organization, where activating the at least one role for the database and generating the in-memory placeholder object may be based on the determination.

In one aspect, the processing device may assign a temporary identifier to the in-memory placeholder object. The processing device may assign a data share identifier of the database to the in-memory placeholder object, where providing the access to the data of the database may be based on the temporary identifier and the data share identifier. In an example, the temporary identifier may be the temporary identifier 422 and the data share identifier may be the data share identifier 424.

In one aspect, the query may further include a database command, and providing the access to the data of the database may include executing the database command based on the universal listing identifier. For example, the database command may be or include the command 416.

In one aspect, the processing device may identify, via an index, the database based on the universal listing identifier, where activating the at least one role and generating the in-memory placeholder object may be based on the identification. In an example, the index may be or include the index 412.

In one aspect, the at least one role may include a share role and a hierarchy of roles associated with the share role. For example, the runtime activated roles 418 may include a share role and a hierarchy of roles.

Figure 6:
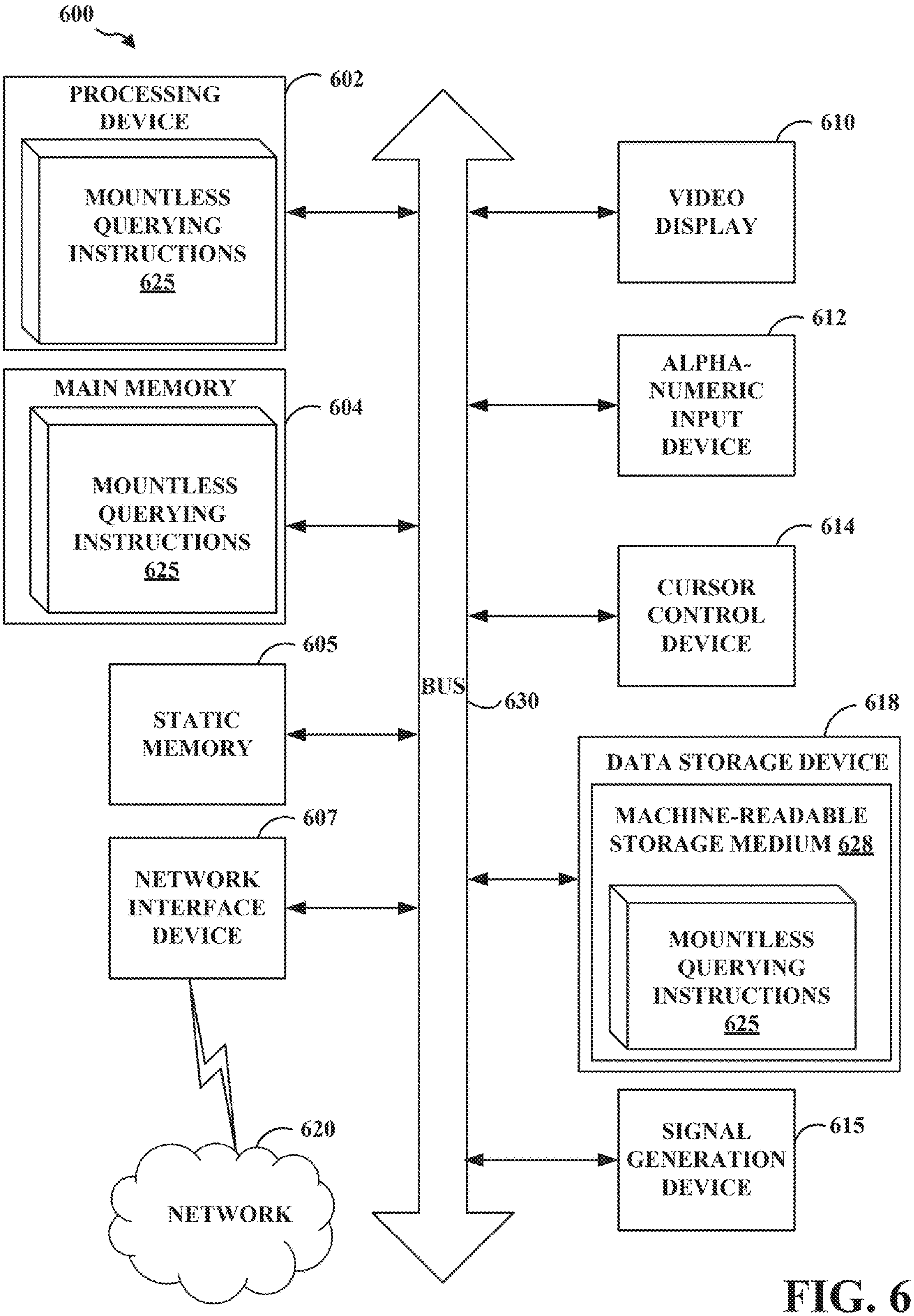
FIG. 6 is a block diagram of an example computing device that may perform one or more of the operations described herein in accordance with some aspects of the present disclosure.

FIG. 6 illustrates a diagrammatic representation of a machine in the example form of a computer system 600 within which includes a set of instructions for causing the machine to perform any one or more of the methodologies discussed herein for mountless querying of listing data.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 600 may be representative of a server.

The computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 600 may further include a network interface device 607 which may communicate with a network 620. The computer system 600 also may include a video display unit 610 (e.g., a liquid crystal display (LCD) or a cathode ray tube (CRT)), an alpha-numeric input device 612 (e.g., a keyboard), a cursor control device 614 (e.g., a mouse), and an acoustic signal generation device 615 (e.g., a speaker). In one embodiment, the video display unit 610, the alpha-numeric input device 612, and the cursor control device 614 may be combined into a single component or device (e.g., an LCD touch screen).

The processing device 602 represents one or more general-purpose processing devices such as a microprocessor, a central processing unit (CPU), or the like. More particularly, the processing device 602 may be a complex instruction set computing (CISC) microprocessor, a reduced instruction set computer (RISC) microprocessor, a very long instruction word (VLIW) microprocessor, or a processor implementing other instruction sets, or processors implementing a combination of instruction sets. The processing device 602 may also be one or more special-purpose processing devices, such as an application specific integrated circuit (ASIC), a field programmable gate array (FPGA), a digital signal processor (DSP), network processor, or the like. The processing device 602 is configured to execute mountless querying instructions 625, for performing the operations and steps discussed herein. For example, the mountless querying instructions 625 may include instructions for obtaining a query that includes a universal listing identifier of a database, wherein the universal listing identifier is different from an identifier for the database; activating, by a processing device and at runtime, at least one role for the database based on the universal listing identifier; generating, based on the universal listing identifier and the at least one activated role, an in-memory placeholder object associated with the database; and providing access to data of the database based on the in-memory placeholder object and the query.

The computer system 600 may include a data storage device 618. The data storage device 618 may include a machine-readable storage medium 628. The machine-readable storage medium 628 may store the mountless querying instructions 625 (e.g., software) embodying any one or more of the methodologies of functions described herein. The mountless querying instructions 625 may also reside, completely or at least partially, within the main memory 604 or within the processing device 602 during execution thereof by the computer system 600; the main memory 604 and the processing device 602 also constituting machine-readable storage media. The mountless querying instructions 625 may further be transmitted or received over the network 620 via the network interface device 607.

The machine-readable storage medium 628 may also be used to store instructions to perform the methods described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "obtaining," "activating," "deactivating," "generating," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

generating, prior to obtaining a query, a database based on an identifier for the database;

obtaining an indication that the database is to be shared within an organization;

generating, based on the indication that the database is to be shared within the organization, an association between a universal listing identifier of the database and the database;

obtaining the query that includes the universal listing identifier of the database, wherein the universal listing identifier is different from the identifier for the database;

activating, by a processing device, at runtime and based on the association, at least one role for accessing the database and shared objects based on the universal listing identifier;

generating, based on the universal listing identifier, the at least one activated role, and the association, an in-memory placeholder object associated with the database; and providing access to data of the database based on the in-memory placeholder object and the query.

2. The method of claim 1, wherein the universal listing identifier comprises:

a first portion comprising an exchanged defined prefix;

a second portion comprising an identifier of the organization; and a third portion comprising an identifier of a resource.

3. The method of claim 1, further comprising:

deactivating, subsequent to providing the access to the data of the database, the at least one activated role; and remove the in-memory placeholder object from memory.

4. The method of claim 1, wherein providing the access to the data of the database comprises transmitting query results associated with the database to a computing device.

5. The method of claim 1, wherein the query is associated with a computing device that belongs to the organization, and wherein the data of the database belongs to the organization.

6. The method of claim 1, further comprising:

determining that a user associated with the query and the database are associated with a same organization, wherein activating the at least one role for the database and generating the in-memory placeholder object are based on the determination.

7. The method of claim 1, further comprising:

assigning a temporary identifier to the in-memory placeholder object; and assigning a data share identifier of the database to the in-memory placeholder object, wherein providing the access to the data of the database is based on the temporary identifier and the data share identifier.

8. The method of claim 1, wherein the query further comprises a database command, and wherein providing the access to the data of the database comprises executing the database command based on the universal listing identifier.

9. The method of claim 1, further comprising:

identifying, via an index, the database based on the universal listing identifier, wherein activating the at least one role and generating the in-memory placeholder object are based on the identification.

10. The method of claim 1, wherein the at least one role comprises a share role and a hierarchy of roles associated with the share role.

11. A system, comprising:

a memory; and a processing device operatively coupled to the memory, the processing device to:

generate, prior to obtaining a query, a database based on an identifier for the database;

obtain an indication that the database is to be shared within an organization;

generate, based on the indication that the database is to be shared within the organization, an association between a universal listing identifier of the database and the database;

obtain the query that includes the universal listing identifier of the database, wherein the universal listing identifier is different from the identifier for the database;

activate, at runtime and based on the association, at least one role for accessing the database and shared objects based on the universal listing identifier;

generate, based on the universal listing identifier, the at least one activated role, and the association, an in-memory placeholder object associated with the database; and provide access to data of the database based on the in-memory placeholder object and the query.

12. The system of claim 11, wherein the universal listing identifier comprises:

a first portion comprising an exchanged defined prefix;

a second portion comprising an identifier of the organization; and a third portion comprising an identifier of a resource.

13. The system of claim 11, wherein the processing device is further to:

deactivate, subsequent to the access to the data of the database being provided, the at least one activated role; and remove the in-memory placeholder object from the memory.

14. The system of claim 11, wherein the query is associated with a computing device that belongs to the organization, and wherein the data of the database belongs to the organization.

15. The system of claim 11, wherein the processing device is further to:

assign a temporary identifier to the in-memory placeholder object; and assign a data share identifier of the database to the in-memory placeholder object, wherein to provide the access to the data of the database, the processing device is to provide the access to the database based on the temporary identifier and the data share identifier.

16. A non-transitory computer-readable medium having instructions stored thereon which, when executed by a processing device, cause the processing device to:

generate, prior to obtaining a query, a database based on an identifier for the database;

obtain an indication that the database is to be shared within an organization;

generate, based on the indication that the database is to be shared within the organization, an association between a universal listing identifier of the database and the database;

obtain the query that includes the universal listing identifier of the database, wherein the universal listing identifier is different from the identifier for the database;

activate, by the processing device, at runtime, and based on the association, at least one role for accessing the database and shared objects based on the universal listing identifier;

generate, based on the universal listing identifier, the at least one activated role, and the association, an in-memory placeholder object associated with the database; and provide access to data of the database based on the in-memory placeholder object and the query.

17. The non-transitory computer-readable medium of claim 16, wherein the universal listing identifier comprises:

a first portion comprising an exchanged defined prefix;

a second portion comprising an identifier of the organization; and a third portion comprising an identifier of a resource.

18. The non-transitory computer-readable medium of claim 16, wherein the instructions, when executed by the processing device, further cause the processing device to:

deactivate, subsequent to the access to the data of the database being provided, the at least one activated role; and remove the in-memory placeholder object from memory.

19. The non-transitory computer-readable medium of claim 16, wherein the query is associated with a computing device that belongs to the organization, and wherein the data of the database belongs to the organization.

20. The non-transitory computer-readable medium of claim 16, wherein the at least one role comprises a share role and a hierarchy of roles associated with the share role.

* * * * *